United States Patent
Rawat et al.

(10) Patent No.: US 12,405,812 B2
(45) Date of Patent: Sep. 2, 2025

(54) COMPUTER VISION TEMPLATE MATCHING SYSTEM AND METHOD

(71) Applicant: Whatfix Private Limited, Bangalore (IN)

(72) Inventors: Vibhu Rawat, Bangalore (IN); Abhilash Jain, Bangalore (IN); Aashish Jain, Bangalore (IN)

(73) Assignee: Whatfix Private Limited, Karnataka (IN)

( * ) Notice: Subject to any disclaimer, the term of this patent is extended or adjusted under 35 U.S.C. 154(b) by 165 days.

(21) Appl. No.: 18/493,549

(22) Filed: Oct. 24, 2023

(65) Prior Publication Data

US 2025/0131622 A1     Apr. 24, 2025

(51) Int. Cl.
*G06F 9/451*     (2018.01)
*G06T 3/40*      (2006.01)
(Continued)

(52) U.S. Cl.
CPC .............. *G06F 9/453* (2018.02); *G06T 3/40* (2013.01); *G06T 5/20* (2013.01); *G06T 5/70* (2024.01);
(Continued)

(58) Field of Classification Search
CPC .... G06T 5/20; G06T 3/40; G06T 5/70; G06T 11/60; G06T 5/73; G06T 2200/24;
(Continued)

(56) References Cited

U.S. PATENT DOCUMENTS

| 7,203,620 B2 | 4/2007 | Li |
| 7,415,675 B2 | 8/2008 | Habon et al. |

(Continued)

FOREIGN PATENT DOCUMENTS

| WO | WO02/29759 A2 | 4/2002 |
| WO | WO2010/141748 A1 | 12/2010 |

OTHER PUBLICATIONS

Interactions Foundation; Help! I need some help! Not just any help hel p in mobile applications; 10 pages; retreived from the internet (https://www.interaction-design.org/literature/article/help-i-need-some-help-not-just-any-help-help-in-mobile-applications) on Aug. 6, 2020.

(Continued)

*Primary Examiner* — Phi Hoang
(74) *Attorney, Agent, or Firm* — Shay Glenn LLP

(57) ABSTRACT

Provided herein are systems and methods for performing optimized template matching within a digital adoption platform used in conjunction with an underlying computer application. In some embodiments, a method includes capturing an image and template from a user interface of the underlying application, converting the image and template to grayscale, detecting a background type of the image and template and inverting one of the background types if there is a mismatch, applying a Gaussian filter to the image and template, dividing the scale of the image by the scale of the template to determine a starting scale, reducing a resolution of at least the image, applying a template matching algorithm to the image and template using the starting scale to locate the template in the image, and remapping the coordinates of the template to reflect its original location on the image.

28 Claims, 16 Drawing Sheets
(8 of 16 Drawing Sheet(s) Filed in Color)

(51) Int. Cl.
  *G06T 5/20* (2006.01)
  *G06T 5/70* (2024.01)
  *G06T 5/73* (2024.01)
  *G06T 11/60* (2006.01)
  *G06V 10/75* (2022.01)
  *G06V 30/414* (2022.01)

(52) U.S. Cl.
  CPC .............. *G06T 5/73* (2024.01); *G06T 11/60* (2013.01); *G06V 10/751* (2022.01); *G06V 30/414* (2022.01); *G06T 2200/24* (2013.01); *G06T 2207/20016* (2013.01); *G06T 2207/20021* (2013.01); *G06T 2210/32* (2013.01)

(58) Field of Classification Search
  CPC ....... G06T 2210/32; G06T 2207/20021; G06T 2207/20016; G06F 9/453; G06F 8/38; G06V 10/751; G06V 30/414
  See application file for complete search history.

(56) References Cited

U.S. PATENT DOCUMENTS

| | | | |
|---|---|---|---|
| 7,533,369 | B2 | 5/2009 | Sundararajan et al. |
| 7,849,405 | B1 | 12/2010 | Coletta et al. |
| 7,861,178 | B2 | 12/2010 | Lui et al. |
| 8,151,202 | B1 | 4/2012 | Cronin et al. |
| 8,707,177 | B1 | 4/2014 | Parle et al. |
| 8,850,315 | B1 | 9/2014 | Rogers et al. |
| 9,063,757 | B2 | 6/2015 | Horton et al. |
| 9,367,199 | B2 | 6/2016 | Klemenz et al. |
| 9,514,437 | B2 | 12/2016 | Becker et al. |
| 9,582,132 | B1 | 2/2017 | Adelman et al. |
| 9,727,348 | B2 | 8/2017 | Chen et al. |
| 10,489,041 | B1 | 11/2019 | Edwards et al. |
| 10,585,686 | B2 | 3/2020 | Saurabh |
| 10,802,846 | B2 | 10/2020 | Rider et al. |
| 10,949,432 | B1 | 3/2021 | Grayson |
| 11,372,661 | B2 | 6/2022 | Namburu et al. |
| 11,461,090 | B2 | 10/2022 | Namburu et al. |
| 11,669,353 | B1 | 6/2023 | Sanghai et al. |
| 11,704,232 | B2 | 7/2023 | Namburu et al. |
| 2001/0017622 | A1 | 8/2001 | Patel et al. |
| 2005/0147054 | A1 | 7/2005 | Loo et al. |
| 2006/0036991 | A1 | 2/2006 | Biazetti et al. |
| 2006/0085750 | A1 | 4/2006 | Easton et al. |
| 2006/0117315 | A1 | 6/2006 | Bussert et al. |
| 2006/0277468 | A1 | 12/2006 | Sapir |
| 2007/0168864 | A1 | 7/2007 | Yamamoto et al. |
| 2008/0301558 | A1 | 12/2008 | Najafi et al. |
| 2009/0179896 | A1* | 7/2009 | Rottger .................. G03B 42/02 345/426 |
| 2009/0281877 | A1 | 11/2009 | Bezos et al. |
| 2010/0180185 | A1 | 7/2010 | O'Hanlon |
| 2010/0205529 | A1 | 8/2010 | Butin et al. |
| 2010/0205530 | A1 | 8/2010 | Butin et al. |
| 2011/0010612 | A1 | 1/2011 | Thorpe et al. |
| 2011/0035486 | A1 | 2/2011 | Seolas et al. |
| 2011/0307818 | A1 | 12/2011 | Eby et al. |
| 2013/0055201 | A1 | 2/2013 | No et al. |
| 2013/0097497 | A1 | 4/2013 | Matejka et al. |
| 2013/0129316 | A1 | 5/2013 | Dontcheva et al. |
| 2013/0326406 | A1 | 12/2013 | Reiley et al. |
| 2014/0344683 | A1 | 11/2014 | Urunga et al. |
| 2015/0202529 | A1 | 7/2015 | Paradise et al. |
| 2015/0220312 | A1 | 8/2015 | Jemiolo |
| 2015/0242304 | A1 | 8/2015 | Akbulut et al. |
| 2015/0254713 | A1 | 9/2015 | Brewer et al. |
| 2016/0004628 | A1 | 1/2016 | Gugri |
| 2016/0019387 | A1 | 1/2016 | Sol et al. |
| 2016/0162167 | A1 | 6/2016 | Shabazz et al. |
| 2016/0246467 | A1 | 8/2016 | Jemiolo et al. |
| 2016/0246615 | A1 | 8/2016 | Jemiolo et al. |
| 2016/0247534 | A1 | 8/2016 | Pan et al. |
| 2016/0350137 | A1 | 12/2016 | Kihara |
| 2016/0351189 | A1 | 12/2016 | Miller et al. |
| 2017/0052824 | A1 | 2/2017 | Sharma et al. |
| 2017/0134828 | A1 | 5/2017 | Krishnamurthy et al. |
| 2017/0139656 | A1 | 5/2017 | Sterling et al. |
| 2017/0177385 | A1 | 6/2017 | Fung et al. |
| 2017/0228349 | A1 | 8/2017 | Yang et al. |
| 2017/0316363 | A1 | 11/2017 | Siciliano et al. |
| 2017/0337122 | A1 | 11/2017 | Bolajwar et al. |
| 2018/0121047 | A1 | 5/2018 | Goel et al. |
| 2018/0143842 | A1 | 5/2018 | Weiss et al. |
| 2018/0157386 | A1* | 6/2018 | Su .................... G06V 30/19173 |
| 2019/0065512 | A1 | 2/2019 | Pestana et al. |
| 2019/0066731 | A1 | 2/2019 | Jarrell |
| 2019/0139092 | A1 | 5/2019 | Normula |
| 2019/0318764 | A1 | 10/2019 | Ishida et al. |
| 2019/0370559 | A1 | 12/2019 | Carter et al. |
| 2020/0021872 | A1 | 1/2020 | Venkatraman et al. |
| 2020/0035113 | A1 | 1/2020 | Bruce et al. |
| 2020/0225927 | A1 | 7/2020 | Pachpande et al. |
| 2020/0285353 | A1* | 9/2020 | Rezazadeh Sereshkeh ................. G06F 9/453 |
| 2021/0042134 | A1 | 2/2021 | Elango et al. |
| 2021/0158438 | A1 | 5/2021 | Greenberg et al. |
| 2022/0083458 | A1* | 3/2022 | Shang .................... G06V 20/44 |
| 2023/0267851 | A1 | 8/2023 | Shanghai et al. |
| 2023/0342188 | A1* | 10/2023 | Dunn ...................... G06F 21/36 |
| 2024/0104890 | A1* | 3/2024 | Nasu ......................... G06T 7/77 |
| 2024/0350050 | A1* | 10/2024 | Doran .................. A61B 5/1103 |

OTHER PUBLICATIONS

MDN Web Docs; CSS selectors; 9 pages; retrieved from the interent (https://developer.mozilla.org/en-US/docs/Web/CSS/CSS_Selectors) on Aug. 6, 2020.

Rosebrock; Multi-scale template matching using python and opencv; 30 pages; retrieved from the internet (https://pyimagesearch.com/2015/01/26/multi-scale-template-matching-using-python-opencv/) on Jan. 18, 2024.

Userlane; 100 percent proficient with any software without it training; 13 pages; retrieved from the internet (https://blog.userlane.com/navigation-system-software/) on Aug. 6, 2020.

Yeo; Here's how this company is tackling the challenges of enterprise tech adoption; 6 pages; retrieved from the internet (https://www.techinasia.com/heres-company-tackling-challengess-enterprise-tech-adoption) on Aug. 6, 2020.

Namburu et al.; U.S. Appl. No. 18/480,420 entitled "Real time relocation of overlay components in a digital adoption platform," filed Oct. 3, 2023.

* cited by examiner

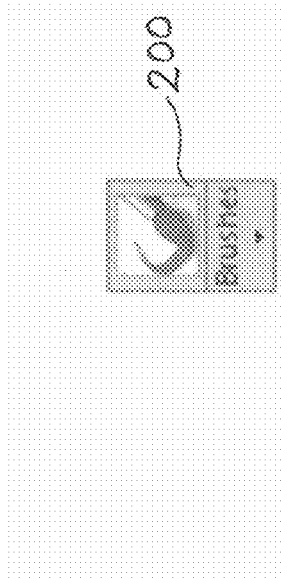
FIG. 6
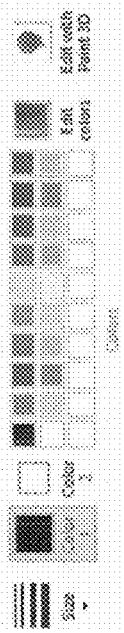
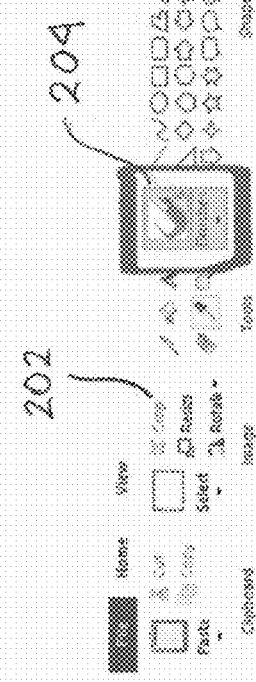
FIG. 7
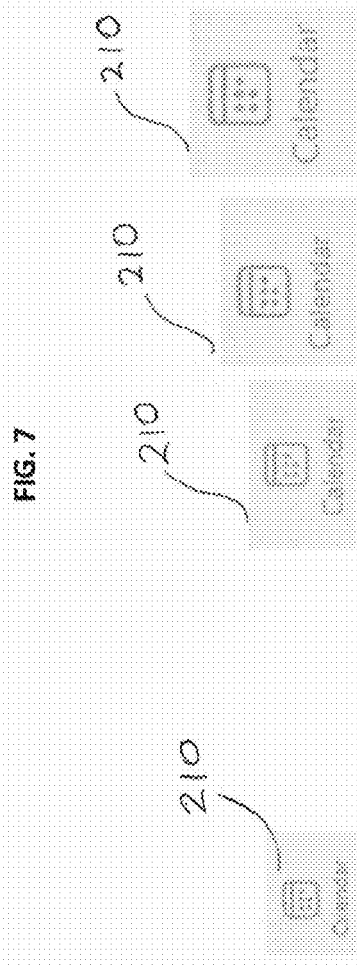
FIG. 8
FIG. 9

```
Scale: 0.6 | Confidence: 0.465 | Iter Time: 405
Scale: 0.8 | Confidence: 0.420 | Iter Time: 469
Scale: 1.0 | Confidence: 0.360 | Iter Time: 385
Scale: 1.2 | Confidence: 0.461 | Iter Time: 383
Scale: 1.4 | Confidence: 0.567 | Iter Time: 476
Scale: 1.6 | Confidence: 0.567 | Iter Time: 388
Scale: 1.8 | Confidence: 0.407 | Iter Time: 491
Scale: 2.0 | Confidence: 0.432 | Iter Time: 474
Total time: 3472.78 ms
```

```
Scale: 0.6 | Confidence: 0.417 | Iter Time: 524
Scale: 0.8 | Confidence: 0.349 | Iter Time: 584
Scale: 1.0 | Confidence: 0.331 | Iter Time: 397
Scale: 1.2 | Confidence: 0.410 | Iter Time: 412
Scale: 1.4 | Confidence: 0.367 | Iter Time: 503
Scale: 1.6 | Confidence: 0.353 | Iter Time: 425
Scale: 1.8 | Confidence: 0.337 | Iter Time: 497
Scale: 2.0 | Confidence: 0.294 | Iter Time: 556
Total time: 3900.61 ms
```

Scale: 1.5 | Confidence: 0.914 | Iter Time: 105
Total time: 163.60 ms

FIG. 18

Meet — 330

Match found

Download ··· ≡ All Documents ∨ ⌕

FIG. 19

COMPUTER VISION TEMPLATE MATCHING SYSTEM AND METHOD

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

There are many ways for end users to learn how to use a particular software application. Increasingly, many methods take the form of digital guidance, such as a Help Section built into the software application or links to online help content. Examples of online help or learning content include knowledge bases, answers to Frequently Asked Questions (FAQs), tutorials, videos, PDF documents, etc. "Walkthroughs" may be provided in either scenario, wherein the user is walked through a particular task or process step by step in the actual software application.

All of the digital guidance content may be provided to a user in one place, organized with a table of contents and or an index, and it may be searchable using keywords. Still, it may be overwhelming to a user to be provided with so much content at once. It is desirable to only provide a limited amount of digital guidance content to a user at any one time, focused on what they may currently need help with and not showing them content that is not currently relevant to what they are doing. Accordingly, a limited number of hyperlinks or other pathways to relevant content may be provided in various sections or segments of the software, and these links may change depending on the task being performed by the end user and or their location in the software application.

Often times the above digital guidance content is not built into the software application to which the content applies but is instead provided by a third party in a separate digital adoption platform (DAP) that is used in conjunction with the underlying software application. Naturally, the third-party developer of a DAP wants it to work seamlessly with the underlying software application. This can be challenging given that the third-party developer of the DAP typically does not have access to the source code for the underlying software application. Additionally, there may be different versions of the underlying source code for different markets, and each version may be updated periodically. It can be challenging to create a single DAP that works seamlessly with each of the versions and each update.

Given the above constraints, the internal functioning of a DAP may require it to search for particular images in the user interface of the underlying software application. Well known techniques for accomplishing this function exist in the prior art. For example, "template matching" can be used to find small parts of an image which match a template image. Information on template matching may be found at en.wikipedia.org/wiki/Template_matching. Also, OpenCV (Open Source Computer Vision Library) is an open source library of programming functions (mainly for real-time computer vision) that implements template matching.

In principle, a "Template" is an "Object" that is intended to be found in an "Image" or screen of an underlying software application. A fundamental challenge lies in making template matching work at different scales and resolutions. For example, a Template captured from an Image that is at 100% scale and 1366 by 768 pixel resolution generally is not detected when run against an Image at 150% scale and 1920 by 1080 resolution. A solution to this problem is recommended by an online article entitled *Multi-scale Template Matching Using Python and OpenCV* by Adrian Rosebrock, Jan. 26, 2015 (pyimagesearch.com/2015/01/26/multi-scale-template-matching-using-python-opencv/). The solution talks of creating Templates at multiple Scales, henceforth referred to as Scale Space, and then iterating through each one of them and matching the Template against the Image until a high confidence score is reached. A challenge with adapting this solution is that the time taken to find the correct match increases with an increase in the number of Templates that are created. Consequently, this solution also requires more system resources to achieve the results.

What is needed and is not provided by the prior art are improved systems and methods for providing digital guidance content. In particular, what is needed are improved systems and methods for performing template matching with increased performance optimization and better resource utilization. The innovations described herein solve these unmet needs and provide additional advantages.

SUMMARY OF THE DISCLOSURE

According to aspects of the present disclosure, systems and methods for performing optimized template matching within a digital adoption platform used in conjunction with an underlying computer application are provided.

In some embodiments, a method of performing optimized template matching comprising the steps of capturing an original image and template from a user interface of the underlying application, converting the original image and the original template to grayscale, detecting a background type of the converted image and of the converted template, and inverting the background type of either the converted template or the converted image if there is a mismatch to create a matched image and template. The method may further comprise applying a Gaussian filter to the matched image and to the matched template to reduce any noise and any blurring in the matched image and in the matched template, dividing a scale of the filtered image by a scale of the filtered template to determine a starting scale, and reducing a resolution of at least the filtered image. The method may further comprise applying a template matching algorithm to the reduced resolution image and the reduced resolution or filtered template using the starting scale to locate the original template in the original image, and remapping coordinates of the original template to reflect its original location on the original image.

In some embodiments, the detecting step of the above method comprises calculating a maximum total pixel intensity of the converted image or the converted template if it were to have a light background, and calculating a minimum total pixel intensity of the converted image or the converted template if it were to have a dark background. The method may further comprise calculating a mean total pixel intensity based upon the maximum total pixel intensity and the minimum total pixel intensity, wherein the mean total pixel intensity equals a mean intensity multiplied by a horizontal number of pixels in the converted image or the converted template and multiplied by a vertical number of pixels in the converted image or the converted template. In some embodiments, the method further comprises calculating a total pixel intensity of the converted image or the converted template by adding up an intensity of each of its pixels. The method may further comprise comparing the total pixel intensity of the converted image or the converted template to the mean total pixel intensity. In some embodiments, the method further comprises labeling the converted image or the converted template as having a light background if its total pixel intensity is greater than the mean total pixel intensity, or labeling the converted image or the converted template as having a dark background if its total pixel intensity is less than the mean total pixel intensity. The method may further comprise inverting the background type of the converted template if there is a mismatch between the background type of the converted template and the converted image.

In some embodiments of the above methods, the step of reducing a resolution of at least the filtered image includes also reducing a resolution of the filtered template. If the original template is not located in the original image when using the starting scale during the application of the template matching algorithm, the method may further comprise running the template matching algorithm again with a different scale ratio. In some embodiments, the different scale ratio is 1.0. If the original template is not located in the original image when using the different scale ratio of 1.0 during the application of the template matching algorithm, the method may further comprise incrementally increasing the different scale ratio and running the template matching algorithm again. In some embodiments, the method further comprises further incrementing the different scale ratio and rerunning the template matching algorithm until the original template is located in the original image or the different scale ratio reaches a predetermined number. In some embodiments, the predetermined number is 2.0. The different scale ratio may be incremented by 0.2 each time the template matching algorithm is rerun.

In addition to the above systems and methods, non-transitory computing device readable medium having instructions stored thereon for providing digital guidance in an underlying computer application are also disclosed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features of the disclosure are set forth with particularity in the claims that follow. A better understanding of the features and advantages of the present disclosure will be obtained by reference to the following detailed description that sets forth illustrative embodiments, in which the principles of the disclosure are utilized, and the accompanying drawings of which:

FIG. 6 is a partial screenshot of an exemplary underlying base application showing an exemplary Template to be found in the Image of FIG. 7.

FIG. 7 is a partial screenshot of an exemplary underlying base application showing an exemplary Image to be searched for the Template of FIG. 6.

FIG. 8 shows another exemplary Template.

FIG. 9 shows the exemplary Template of FIG. 8 in three different scales.

FIG. 18 is a table showing the results of searching the Image of FIG. 11 for the Template of FIG. 13 using the exemplary method of FIG. 10.

FIG. 19 is a partial screenshot showing the results of searching the Image of FIG. 11 for the Template of FIG. 13 using the exemplary method of FIG. 10.

DETAILED DESCRIPTION

Described herein are apparatuses (e.g., systems, computing device readable media, devices, etc.) and methods for an improved digital guidance platform. The innovative platform changes the way application support and learning content is consumed. In some embodiments, this is accomplished by providing contextual and interactive walk-throughs inside software applications at the time a task is being performed (i.e., providing real-time guidance to users.) Examples of software applications that the platform may be used with include Salesforce®, Oracle CRM®, Microsoft Dynamics®, Success Factors®, SharePoint® and other applications. In some embodiments, the innovative platform may take the form of a simple web browser extension. Developers of a software application may use the extension to provide guided navigation to users of the software application so that the users can quickly learn how to use the application. The users' training and or support experience can be enhanced with walkthroughs, smart pop-ups and tool-tips provided by the platform. These platform tools may be configured to show up based on a particular user's role and current location in the software application. The innovative platform may be used with enterprise application software (such as the software applications mentioned above), custom application software (such as created by an IT department for a company's internal use), and end user software. Depending on the application, the innovative platform may be the only training and support program for the application, or it may be used in conjunction with a training and support program native to the application.

In some embodiments, the innovative platform supports an end user through their entire life cycle with a software application. This may include new user onboarding, continuous training, self-serve contextual support, assistance with data field validation, and application change management. The platform technology may include omni-channel integrations (such as integrating with knowledge systems, bases and repositories), workflow automation, in-place answers, workflow analytics, and content authoring.

Figure 1:
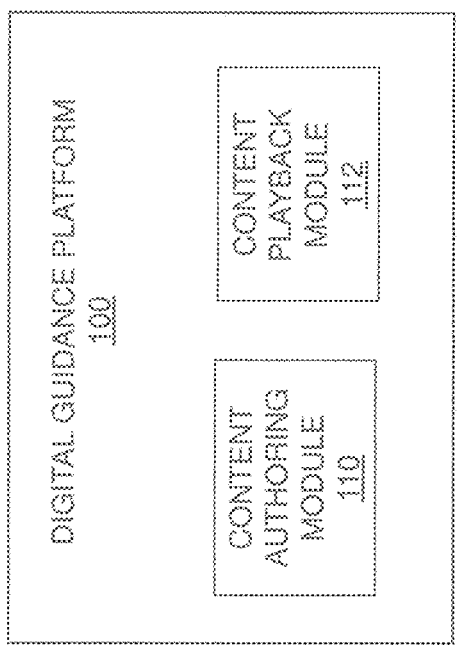
FIG. 1 is a diagram showing an example of a digital guidance platform configuration for providing digital guidance in an underlying computer application.

Referring to FIG. 1, an exemplary digital guidance platform 100 is depicted. It may include a content authoring module 110 (also referred to as an editor) and a content playback module 112, as shown. In this exemplary embodiment, the content authoring module 110 allows a content author to create digital guidance for end users of an underlying software application. Once this content is created and saved, it may be accessed or "played back" using the content playback module 112. In some implementations, the content authoring module 110 and the content playback module 112 are combined and provided to a content author in a single software package. In use, the software package may reside on a content author's computer, and or may reside on a server in "the cloud" and be offered as Software as a Service (SaaS.) In other implementations, content authoring module 110 and a content playback module 112 may be separately deployed. For example, one of the modules may take the form of a simple web browser extension as previously mentioned, and the other module may be downloaded to a content author's computer.

Figure 2:
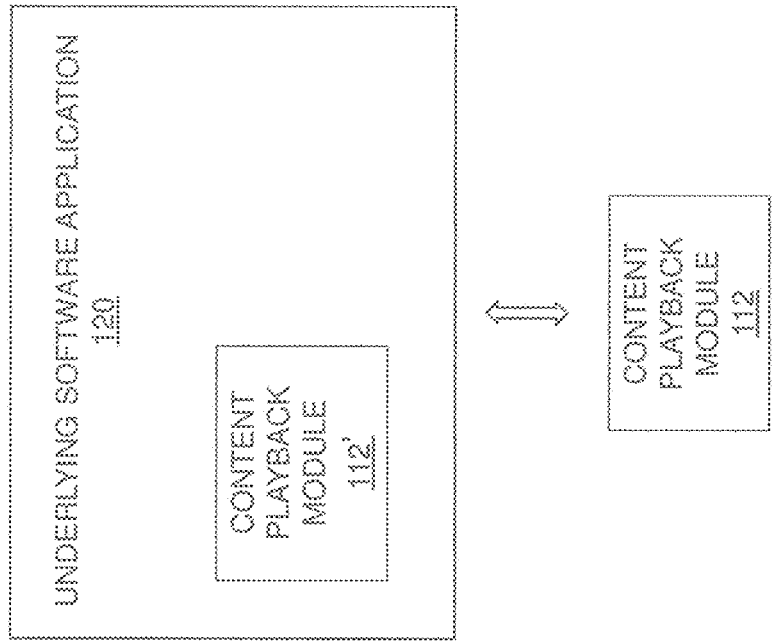
FIG. 2 is a diagram showing exemplary configurations of how the digital guidance platform of FIG. 1 interfaces with an underlying computer application.

Referring to FIG. 2, exemplary content playback configurations are depicted. In some implementations, content playback module 112 is a standalone system that is accessed by an end user from within an underlying software application 120. For example, an underlying software application 120, such as Salesforce®, may be provided with links to access content playback module 112, which is located on a server in the cloud. In some implementations, content playback module 112' may be integrated within the underlying software application 112'. In either of these exemplary configurations, the end user is able to access the digital guidance content from content playback module 112 or 112' while using a feature of underlying software application 120 with which the content is associated. In some implementations, both an integrated content playback module 112' and an external module 112 are available to the end user.

Figure 3A:
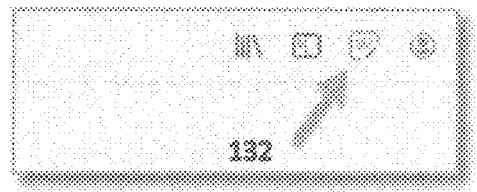
FIGS. 3A-3I are a series of partial screenshots showing exemplary functionality of a content authoring module/editor.

Referring to FIGS. 3A-3I, exemplary functionality of content authoring module/editor 110 will be described in relation to the exemplary partial screenshots in the figures. In this exemplary embodiment, the patent applicant's company name "whatfix" is used as the name of digital guidance platform 100. The exemplary functionality includes the ability to create a "walkthrough", which will walk an end user of underlying software application 120 through each sequential step of a particular task in application 120 when the walkthrough is played back. In some implementations, the walkthrough can proceed either one step at a time, waiting at the end of each step for the end user to advance the walkthrough to the next step. Alternatively, the walkthrough can proceed automatically, running through all of the steps without stopping (unless paused by the user.) Additionally, the walkthrough can provide the end result of the task that the walkthrough is teaching. For example, a walkthrough can show an end user each step needed to determine the number of open sales leads that have not been contacted, and at the end of the walkthrough the actual number is provided to the end user. Referring first to FIG. 3A, the creation of a walkthrough begins by the author logging in to the underlying application where the author wants to create content, and then launching the previously described content authoring module/editor 110 by clicking icon 132.

Figure 3B:
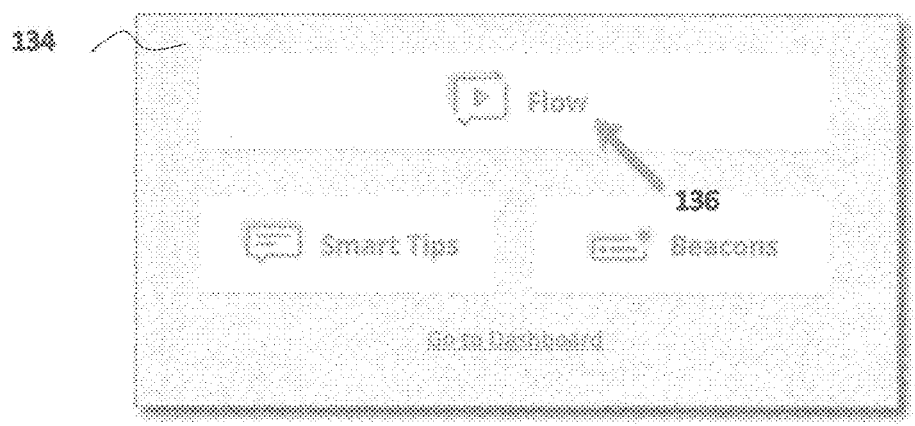

Once the editor launches, it displays window 134 as shown in FIG. 3B. Window 134 includes three buttons labeled Flow, Smart Tips and Beacons. The Flow button is for creating walkthroughs, the Smart Tips button is for creating content associated with data field validation, and the Beacons button is for creating content associated with software application change management. In this example the author clicks the Flow button 136.

Figure 3C:
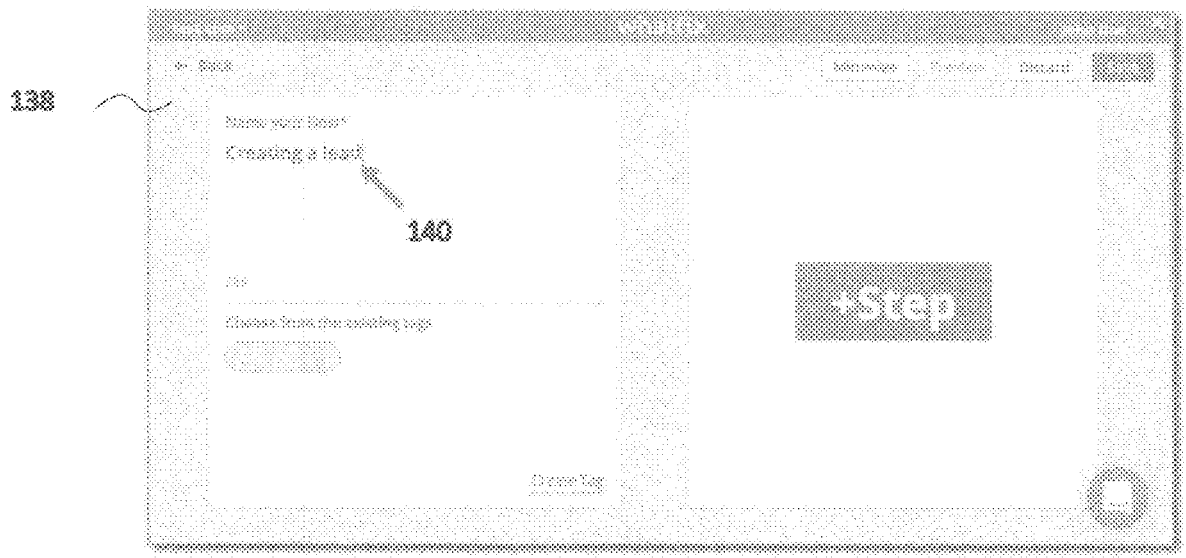

Clicking Flow button 136 opens window 138, as shown in FIG. 3C. Here the author can name the Flow or walkthrough as they want it to be displayed to an end user. In this example, the Flow is named "Creating a lead", as shown by arrow 140.

Figure 3D:
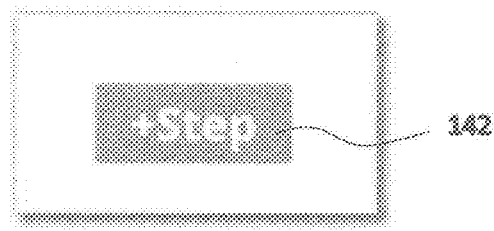
Figure 3E:
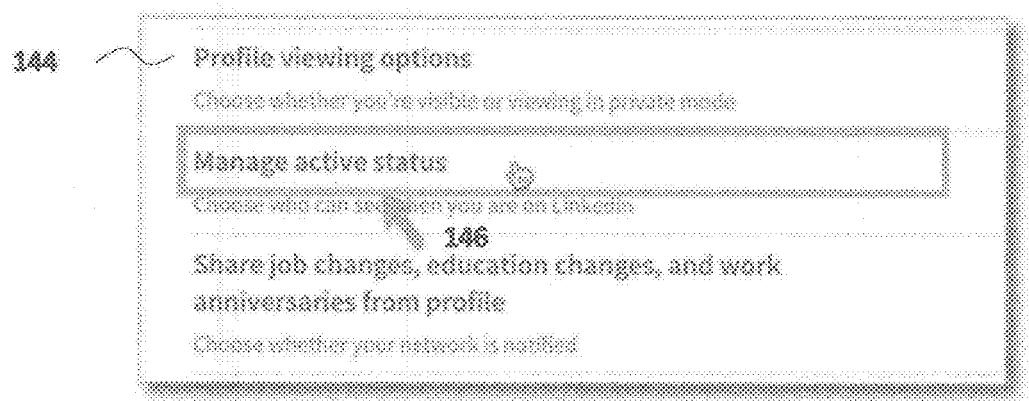

The author then clicks the +Step button 142, as shown in FIG. 3D. In some embodiments, the pointer icon changes (such as from an arrow to a hand), as shown in screen 144 of FIG. 3E, to indicate that the editor is waiting for the author to select a step of the sequence that the end user is to be guided through. The author then clicks the desired element on the page of the underlying software application that the end user will need to select. In this example, the end user will be guided to select the Manage Active Status button 146 on screen 144 during playback of the walkthrough, so the Flow author clicks button 146 at this time.

Figure 3F:
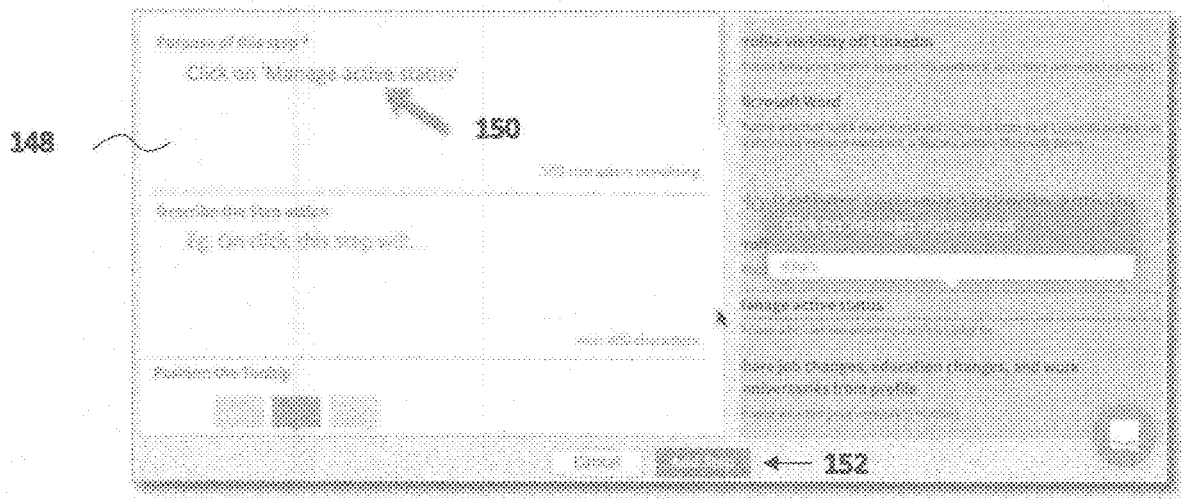

After the Flow author clicks the desired element 146, the editor module displays screen 148 as shown in FIG. 3F with automatically generated action text 150 describing the particular step. The Flow author may then review, edit and or add text or other information associated with the step. The author may also select other parameters regarding how this step of the walkthrough will be played back, such as the position of the Tooltip on the screen, or accept some or all of the default settings. Once the parameters of this step are in order, the author then clicks the Add Step button 152.

Figure 3G:
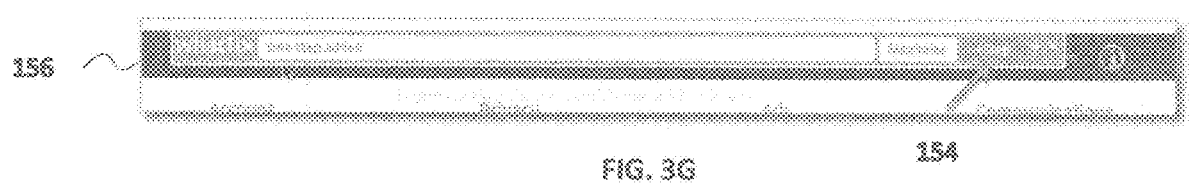
Figure 3H:
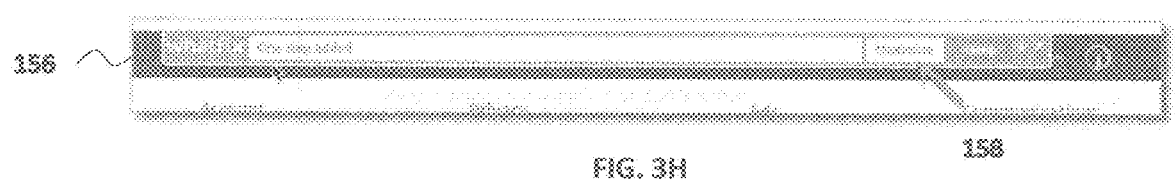
Figure 3I:
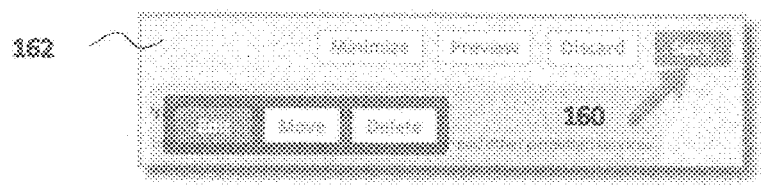

To capture the next step in the sequence, the Flow author then navigates to where in the underlying software application the author wants to start the next step. The author then clicks the +Step button 154 in the editor toolbar 156, as shown in FIG. 3G. The pointer icon again changes to indicate that the editor is waiting for the author to select another step of the sequence, as previously described in reference to FIG. 3E. The author then repeats the intervening actions described above for each step that is to be added to the Flow sequence. When all the steps have been captured, the author clicks the Maximize button 158 on the editor toolbar 156, as shown in FIG. 3H, and then clicks the Save button 160 after window 162 opens, as shown in FIG. 3I.

Before various walkthroughs are made available to end users of the underlying software application, segmentation or mapping may be used to associate each walkthrough with a particular page or part of the underlying software. Segmentation helps content authors display only walkthroughs that are relevant to end users when they are on a particular page. Segmentation, as the name implies, provides a way of targeting walkthroughs to specific users on "widgets" like Self-help and Task List on previously described content playback module 112. Segments can be defined through various conditions and rules. In some embodiments, a segment can be built to filter walkthroughs as per user login, the contents of a Uniform Resource Locator (URL), elements on the screen, and/or a mix of other criteria. For example, segments may be used to display walkthroughs based on a particular group of users' logins, a current tab an end user is on, visual elements on pages of the underlying software and/or other variable(s) defined by the walkthrough author.

Figure 4A:
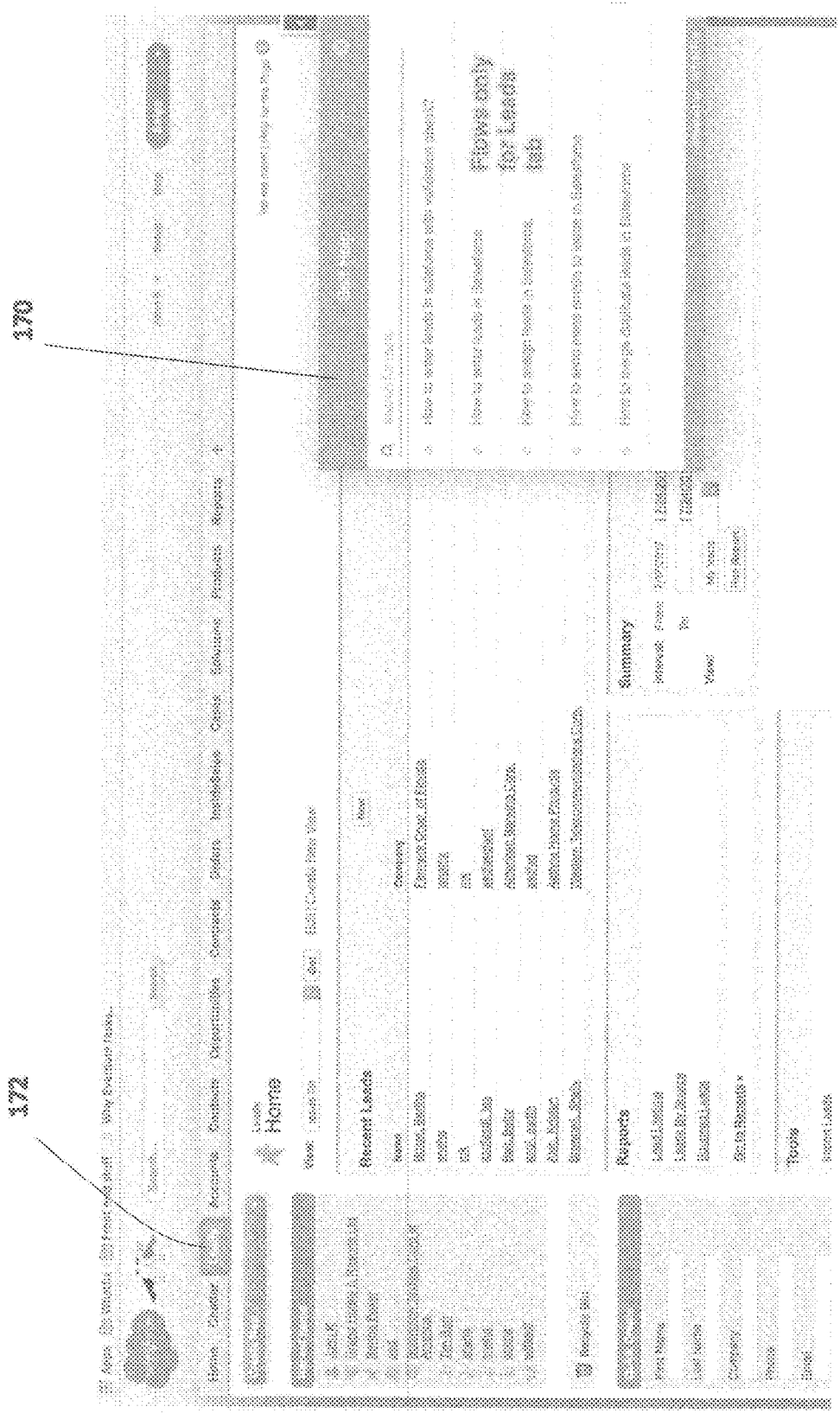
FIGS. 4A and 4B are screenshots showing examples of different lists of walkthroughs that are displayed by a content playback module depending on the location of an end user in an underlying software application.
Figure 4B:
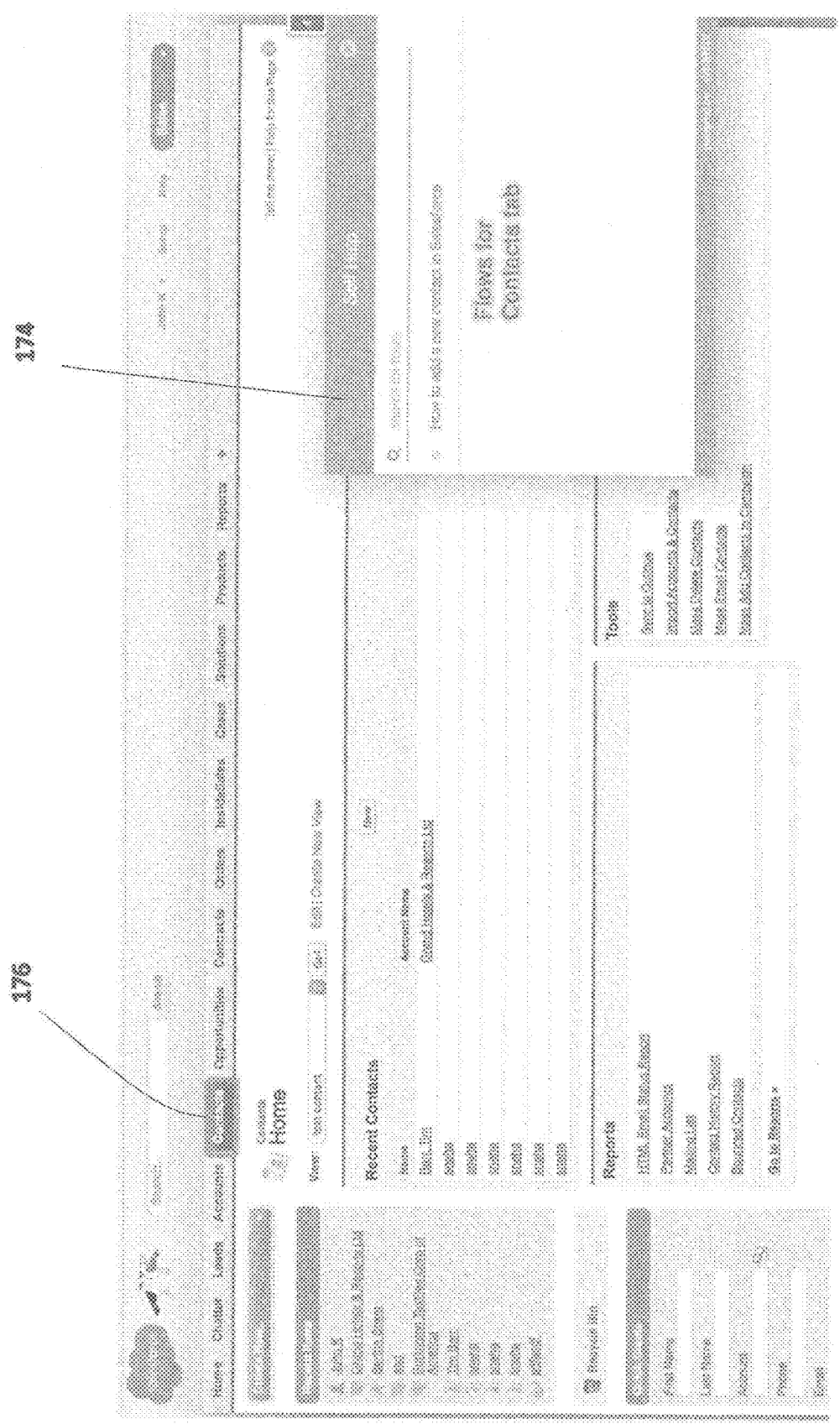

In one embodiment, a page of the underlying software application may have two different tabs, for example: Leads and Contacts. Using segments, different walkthroughs can be displayed depending on which tab the end user navigates to. Rather than seeing a long list of help content, the end user only sees contextual content that is relevant to the particular page and tab currently being used. FIG. 4A shows an example of a list of walkthroughs 170 that is displayed by content playback module 112 when the end user has navigated to the Leads tab 172 of an underlying Salesforce application and clicked on Self Help. FIG. 4B shows an example of a different list of walkthroughs 174 that is displayed by module 112 when the end user has navigated to the Contacts tab 176.

Segments can be created through a simple selection of walkthroughs and visibility rules provided in the editor module 110. To segment walkthroughs, an author can manually select all the necessary flows/walkthroughs to display on a particular page of the application. Segmentation can be set up based on tags as well. Tags can be as simple as a user group or the page/module name. Segmentation of flows can be set up through single or multiple tags. In some embodiments, the editor module 110 can perform segmentation on the basis of visual elements found in the application. The editor can segment flows based on visual elements present or absent on various pages of the underlying application.

Referring to FIGS. 5A-5I, specific examples of types of segmentation criteria that may be used are provided.

Figure 5A:
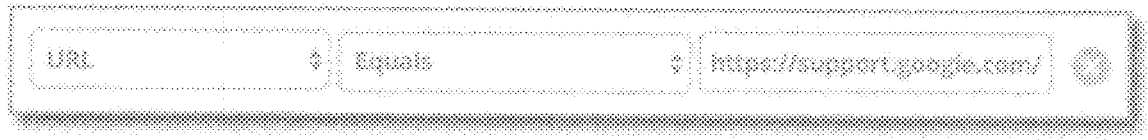
FIGS. 5A-5I are a series of partial screenshots showing examples of types of segmentation criteria.

Referring to FIG. 5A, a Uniform Resource Locator (URL) may be used to segment flows. In some embodiments, any part of the URL may be specified as a visibility rule. For example, the URL Hostname, path, parameter, etc. may be specified using this criterion.

Figure 5B:
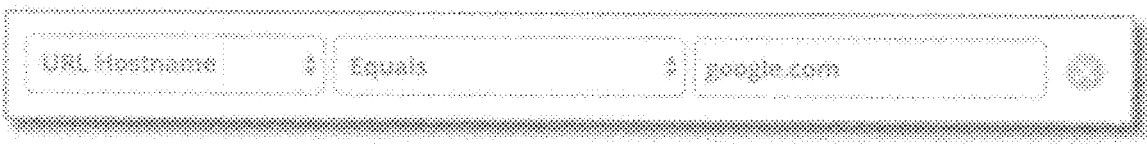

Referring to FIG. 5B, a URL Hostname may be used to segment flows. In some
implementations, a content author may want to uniquely identify a page using the domain name and can use this condition. The URL Hostname is the first part of any URL. For example, if the author wished to display the tip only if the end user is on google.com, she can add a condition as shown in the screenshot of FIG. 5B.

Figure 5C:
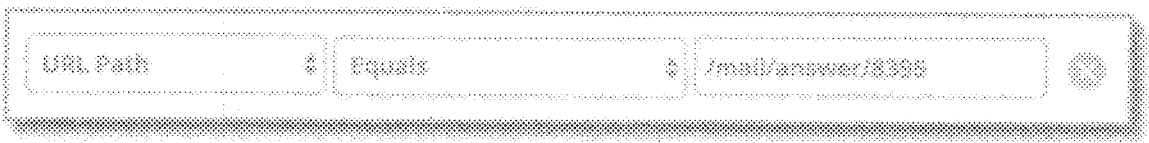

Referring to FIG. 5C, a URL Path may be used to segment flows. The website path name is what is listed between a domain name and the parameters or hashes. For example, if the website URL is //support.google.com/mail/answer/8395?hl=en&ref_topic=3394219, then the pathname is /mail/answer/8395. This condition may be specified as shown in FIG. 5C.

Figure 5D:

Referring to FIG. 5D, a URL Parameter may be used to segment flows. If an author wishes to identify a web page using the parameters on the URL, this condition may be used. For example, if a tip is to be shown to a user only when the search phrase has "water" in Google, this can be set up as shown in FIG. 5D. In this example, three conditions need to be met: 1) the page must be google.com (URL Hostname); 2) the pathname is/search (URL Path); and 3) the query parameter is?q=water.

Figure 5E:
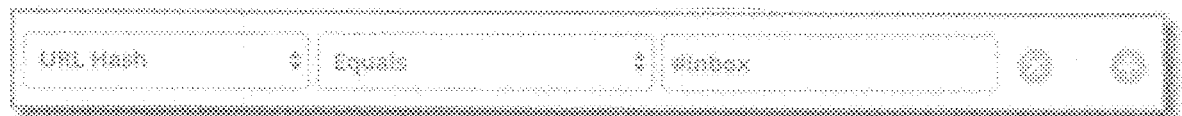

Referring to FIG. 5E, a URL Hash may be used to segment flows. In particular, a page may be identified using the hash value of the URL using this condition. Hashes are usually present in Single page applications made using AngularJs or ReactJs. Typically, there are no page refreshes but only Hash changes.

Figure 5F:
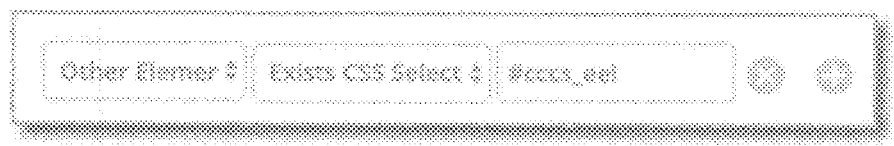

Referring to FIG. 5F, Other Elements may be used to segment flows. For example, if a content author wants to identify a page based on the presence of a particular element (other than the one selected by the author for the flow) on the web page, this condition can be used. In some embodiments, the values passed to this condition are Cascading Style Sheets (CSS) selectors, such as #ID, .class or Jquery. Cascading Style Sheets is a stylesheet language used to describe the presentation of a document written in HTML or XML. CSS describes how elements should be rendered on screen or on other media. Note that in some implementations, use of this condition to segment flows can slow down the underlying application. Further information on the use of CSS selectors may be found on the internet, such as at https://developer.mozilla.org/en-US/docs/Web/CSS/CSS_Selectors.

Figure 5G:
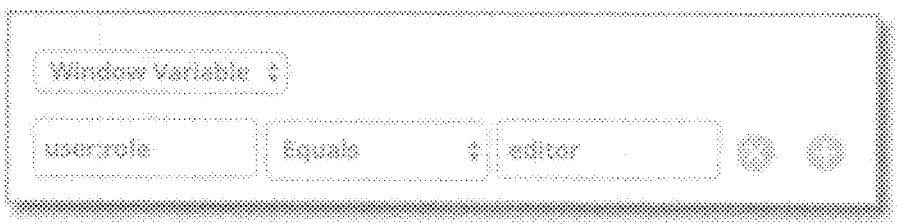

Referring to FIG. 5G, a Window Variable may be used to segment flows. In some implementations, a value of a particular JavaScript global variable is used to identify conditions for showing tooltips. For example, an option to check "user.role-'admin" may be provided to set this condition. This option may also be to perform comparisons, such as using the following criteria: Greater than; Less than; Date Greater than; or Date Less than.

Figure 5H:
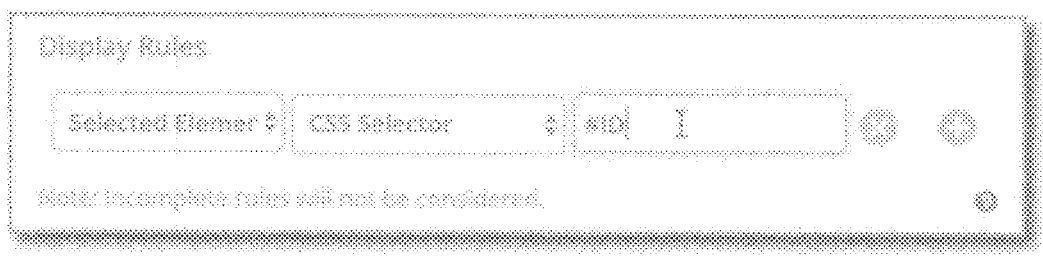

Referring to FIG. 5H, an Element CSS Selector/JQuery may be used to segment flows. In some implementations, the application uses unique IDs for some elements on the page. This option may be used when the element is selected from a list of options. For example, a drop-down menu. This lets an author provide their own CSS selector identifier for the element. Sample values include: #ID_ELEMENT; CLASSNAME; input [title="Search"]; and $("#ID").

Figure 5I:
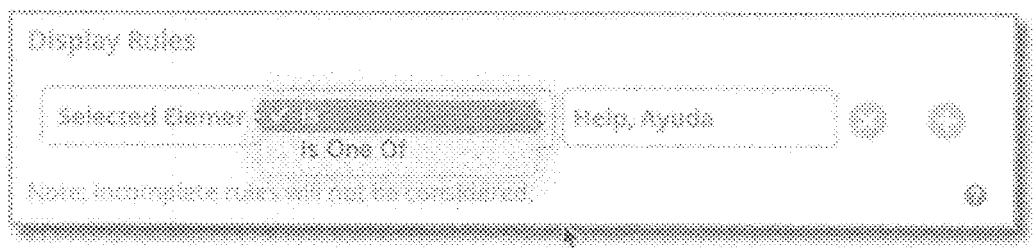

Referring to FIG. 5I, an Element Text may be used to segment flows. In some implementations, this is the text that is displayed on the Element selector that is described above in reference to FIG. 5H. If an application supports multiple languages, the option "is one of" may be chosen and the name added with a comma (,) as a delimiter.

The exemplary segmentation criteria described above with reference to FIGS. 5A-5I may be used to manually segment various flows/walkthroughs and other content. According to aspects of the disclosure, editor module 110 may also be configured to automatically segment the content. In some embodiments, the content is automatically segmented as it is created, with no additional steps required by the content author. This may be referred to as "intelligent segmentation" (IS). In some embodiments, intelligent segmentation eliminates the need to create multiple segments (manually) to display relevant content contextually to different audiences on an underlying application. For example, if an underlying application has five pages and two user roles, traditionally ten segments would need to be created to ensure that each kind of user sees only the relevant topics on each of the five pages. But when intelligent segmentation is enabled and content is being created, editor module 110 can automatically determine which content is to be shown on which page. In some embodiment, editor module 110 can do this based on where the walkthrough was created and certain other predefined criterion. The content author need not do any additional configuration as more content is created.

Intelligent segmentation can also ensure that if an end user is not on the first screen of a walkthrough, playback of the walkthrough starts from the most relevant page that the user is on. For example, the walkthrough that the user is launching may have 10 steps. If the user is already in step 3 on the application and then decides to launch the walkthrough, IS ensures that the walkthrough starts from step 4 and not from the earlier steps that the user has already completed.

Currently when the users open self-help, all the users see the same set of contents as designed by the content creators. But the needs of individual users vary and hence, they must spend time seeking out the particular content they need. Instead, the contents can be personalized for every user based on a recommendation engine as described herein, so that users find the content they need upfront when they open self-help. Users also find self-help more useful and their engagement with self-help goes up. This results in self-help being used more often and not for longer period of time, thereby improving user engagement.

According to aspects of the present disclosure, systems and methods are provided in a Digital Adoption Platform (DAP) for performing optimized template matching in the user interface of an underlying base application. Referring to FIGS. 6-21, an exemplary embodiment of a system implemented according to aspects of the present disclosure will be described.

As mentioned in the Background section herein, "template matching" can be used to find small parts of an image which match a template image. Information on template matching may be found at en.wikipedia.org/wiki/Template_matching. Also, OpenCV (Open Source Computer Vision Library at opencv.org) is an open source library of programming functions (mainly for real-time computer vision) that implements template matching.

Referring to FIGS. 6 and 7, an exemplary Template 200 and an exemplary Image 202, respectively, are shown to help illustrate the concept of template matching. In principle, Template 200 is an "Object" that is intended to be found in Image 202. Image 202 may be a user interface screen, or in this case a portion thereof, of an underlying software application. As can be seen in FIG. 7, Image 202 does indeed contain a Match 204 that is an image which is similar or identical to Template 200.

A fundamental challenge lies in making template matching work at different scales and resolutions. For example, a Template captured from an Image that is at 100% scale and 1366 by 768 pixel resolution generally is not detected when run against an Image at 150% scale and 1920 by 1080 resolution. A solution to this problem is recommended by an online article entitled *Multi-scale Template Matching Using Python and OpenCV* by Adrian Rosebrock, Jan. 26, 2015 (pyimagesearch.com/2015/01/26/multi-scale-template-matching-using-python-opencv/). The solution talks of creating Templates at multiple Scales, henceforth referred to as Scale Space, and then iterating through each one of them and matching the Template against the Image until a high confidence score is reached. A challenge with adapting this solution is that the time taken to find the correct match increases with an increase in the number of Templates that are created. Consequently, this solution also requires more system resources to achieve the results.

Referring to FIGS. 8 and 9, another template matching example is provided. In FIG. 8, an exemplary Template 210 is shown, which is found in a Microsoft Teams® application. Template 210 was captured at a Scale of 100%. In this example, the intent is to find Template 210 in the Microsoft Teams® application. "Scale Space", as used herein, is thus defined as the same Template 210 captured at multiple Scales, as shown in FIG. 9. A template matching algorithm typically involves a pixel-to-pixel comparison, and when it is run for multiple scales of the same Template 210, each additional scale or search iteration involves additional time. Consequently, additional system resources are required, as compared to running the template matching algorithm against just a single Scale. Hence, computing resources as well as computing intensiveness (time) associated with the matching operation can be greatly affected by a multi-scale match. Defining a Scale Space for a particular situation therefore becomes a challenge, for it is difficult to predict the variations that can be involved with each situation.

Figure 10:
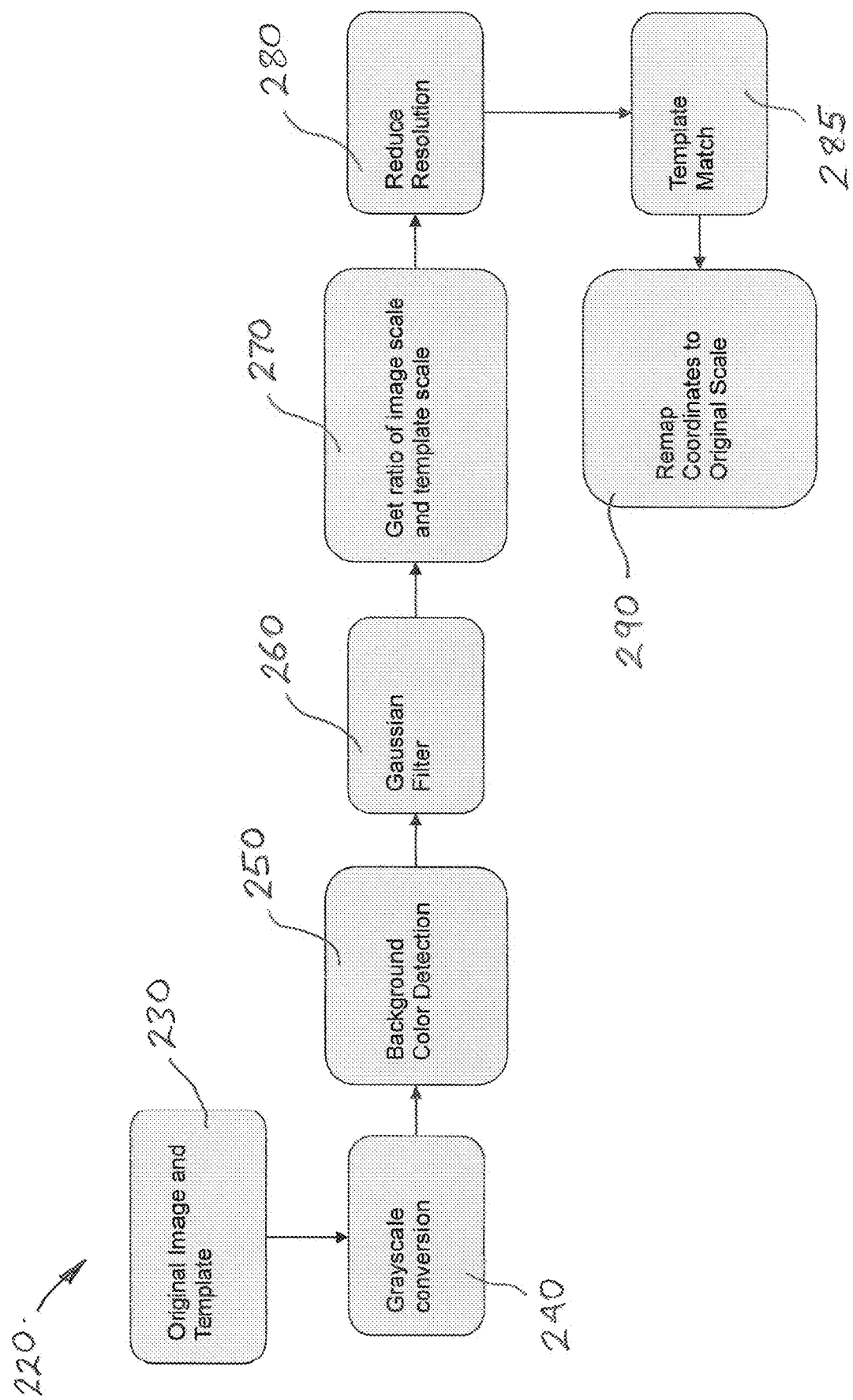
FIG. 10 is a flow chart showing an exemplary template matching method according to aspects of the present disclosure.

Referring now to FIG. 10, an exemplary Digital Adoption Platform (DAP) template matching system and method will be described. The exemplary template matching method 220 depicted in FIG. 10 involves a series of steps, with each step acting as a filter and an input for the step that follows it.

Exemplary template matching method 220 starts with step 230 in which an original Image and Template are captured. These can be captured at any Scale and Resolution, and without any manipulation. The Image and Template are used as the inputs to method 220.

After the Image and Template are captured in step 230, they both are converted to grayscale in step 240. To store a single-color pixel of an RGB (Red, Green, Blue) color image, 24 bits are needed (8 bits for each color component, times 3). But when an RGB image is converted to a grayscale image, only 8 bits are required to store a single pixel of the image. Gray-scaling helps to reduce the multiple channels in an image from RGB and Alpha to just a single channel that only has gray information. The reduction in channels implies fewer calculations and is therefore less computationally intensive.

In step 250, the background of the Template and Image are addressed. This helps to eliminate the variable of background, Dark or Light, between a Template and an Image, consequently making the template matching method 220 run independent of the background. During content creation, a Template could be captured on a Light (or Dark) background, while during Play, it could be matched against the Image that has a Dark (or Light) background. To ensure the Background of the Image and Template are matched, pixels' intensity can be used to detect the background during Capture as well as during the time of Play, and the Background color can be inverted if there is a mismatch.

In some implementations of method 220, the following calculations are performed. For an image having a resolution M×N Pixels, the maximum intensity considering all Pixels are White would be M×N×255, where 255 is the intensity representation of White. For an all-Black image, the overall Pixels' intensity would be 0. The mean of these two extremes of White and Black represents the Pixels' intensity as M×N×127.5. Depending on where the Image lies, above or below M×N×127.5 when its Pixels' intensities are added up, it is classified as either a Dark or a Light background. If the Image is determined to have a background type that is the opposite of that of the Template, the background of the Template can be inverted to match the background of the Image. In some implementations, the background of the Image rather than the background of the Template is inverted. OpenCV's bitwise_not method may be used to invert the background. In some implementations, any image pixel having a value between 0 and x is reassigned a value of 255, and or any pixel having a value between y and 255 is assigned a value of 0, where x is a predetermined integer between 0 and 127, inclusive, and y is a predetermined integer between 128 and 255, inclusive.

In step 260, a Gaussian Filter is predominantly applied to reduce any noise and blurring in the Image and the Template.

In step 270, the scale of the Template and the scale of the Image can be obtained from system meta-data and the Image's Scale is divided by the Template's Scale. The Ratio of the Image Scale to the Template Scale helps to define the starting Scale, which has the highest probability of finding the Template in the Image. For example, if the Image is at scale 150% and the Template is Captured at Scale of 100%, a ratio of 1.5 (150/100) is used to set the starting point of the Template Scale.

In this example, the Template's dimensions are scaled up or scaled down by the ratio, also taking into account the ratio of change in the Image dimensions as the resolution is changed. So if changing the resolution of the Image changes the original width W and height H to W1 and H1 respectively, in this example the Template's width will be scaled by 1.5 times W1/W and the Template's height will be scaled by 1.5 times H1/H. After that, the scaled Template is looked up in the Image. The inventors have observed that the probability of finding the Template increases with the scaling operation, so the number of iterations to find a match in the Image reduces to 1 in most of the cases. However, if the Template is not found at the starting ratio, then a different ratio(s) can be used to iterate with a gap of 0.2 from a minimum limit of 1 to a maximum limit of 2, following the aforementioned formula of deriving Width and Height. In this example, if the Template is not found with 1.5, then 1.0, 1.2, 1.4, 1.6, 1.8, and 2.0 can be tried in succession until the Template is found.

In step 280, the Resolution of an Image being searched is reduced. This step is performed to improve the efficiency of the Operation. The lower the resolution, the lower the computational intensiveness required to match the Template and the Image. For example, the number of instructions needed to match a Template having a resolution of 10×10 with an Image having a resolution of 1920×1080 will be higher than the number of instructions required to match a Template having a resolution of 10×10 with an Image having a resolution of 600×400. In some implementations, the Resolution of the Template may also be reduced.

In step 285 of exemplary method 220, the output of step 280 is input into a Template Matching Algorithm, such as Template Matching Algorithm from the OpenCV (Open Source Computer Vision Library at opencv.org), as mentioned above.

In step 290, the Coordinates of the Template on the Image where the Template is found are remapped after the Calculations to reflect the original location of the Template on the Image. This can be accomplished by multiplying the coordinates' values by the scale factor on which the Template was found. While bringing the resolution down of the original Image, the dimensions of the Image are reduced to W1*H1 from W*H. For example, when the Template is found at location x, y, the location can be remapped by following x1=x*(W/W1) and y1=y*(H/H1) where x1 and y1 represent the new location of the Template in the Image.

Referring to FIGS. 11-21, examples are provided which compare the results of using a conventional template matching approach with one that utilizes inventive aspects disclosed herein. In these examples, a Template is searched for within two Images, each Image having a different type of background.

Figure 11:
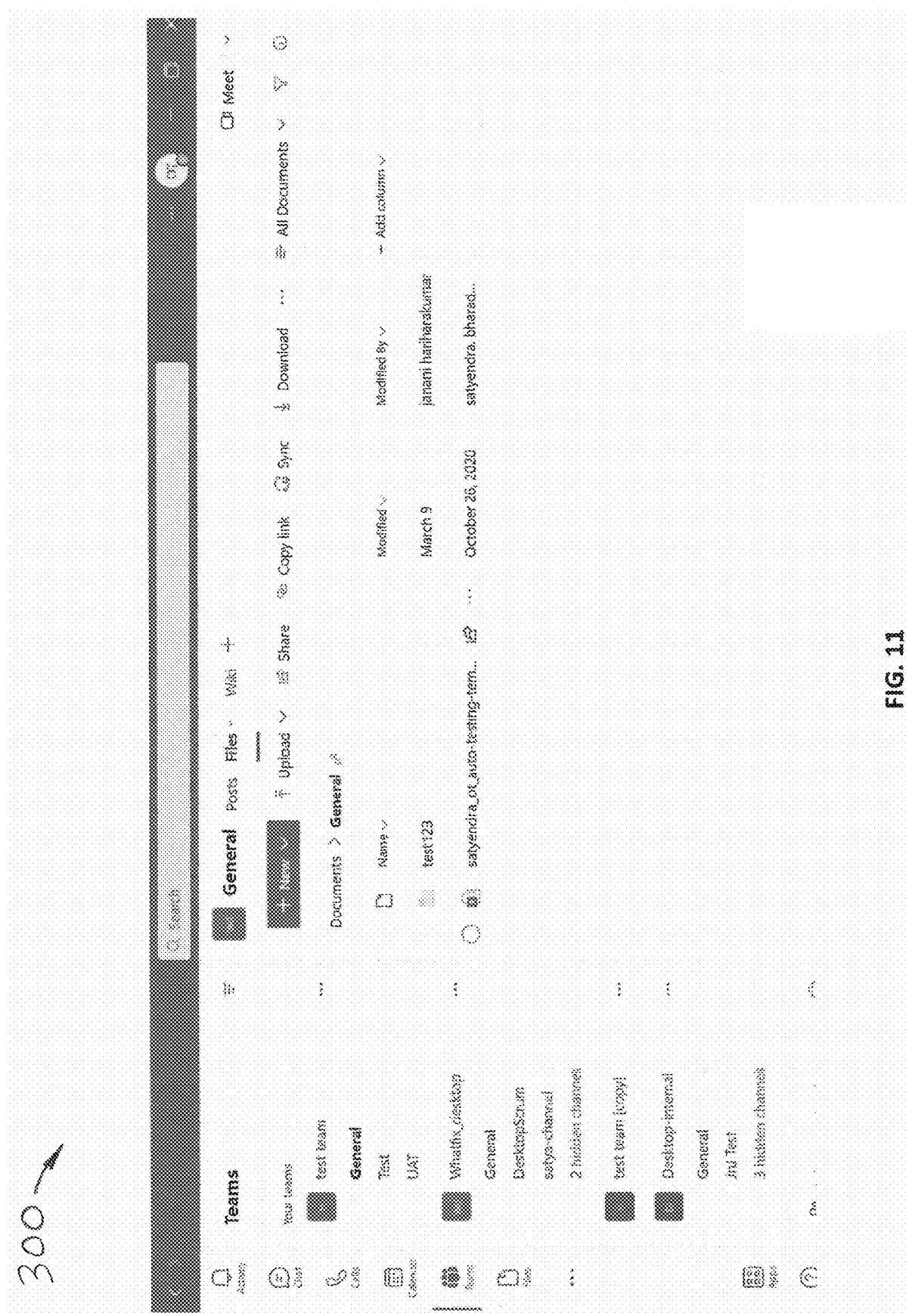
FIG. 11 is a partial screenshot of an exemplary underlying base application showing an Image having a light-colored theme.
Figure 12:
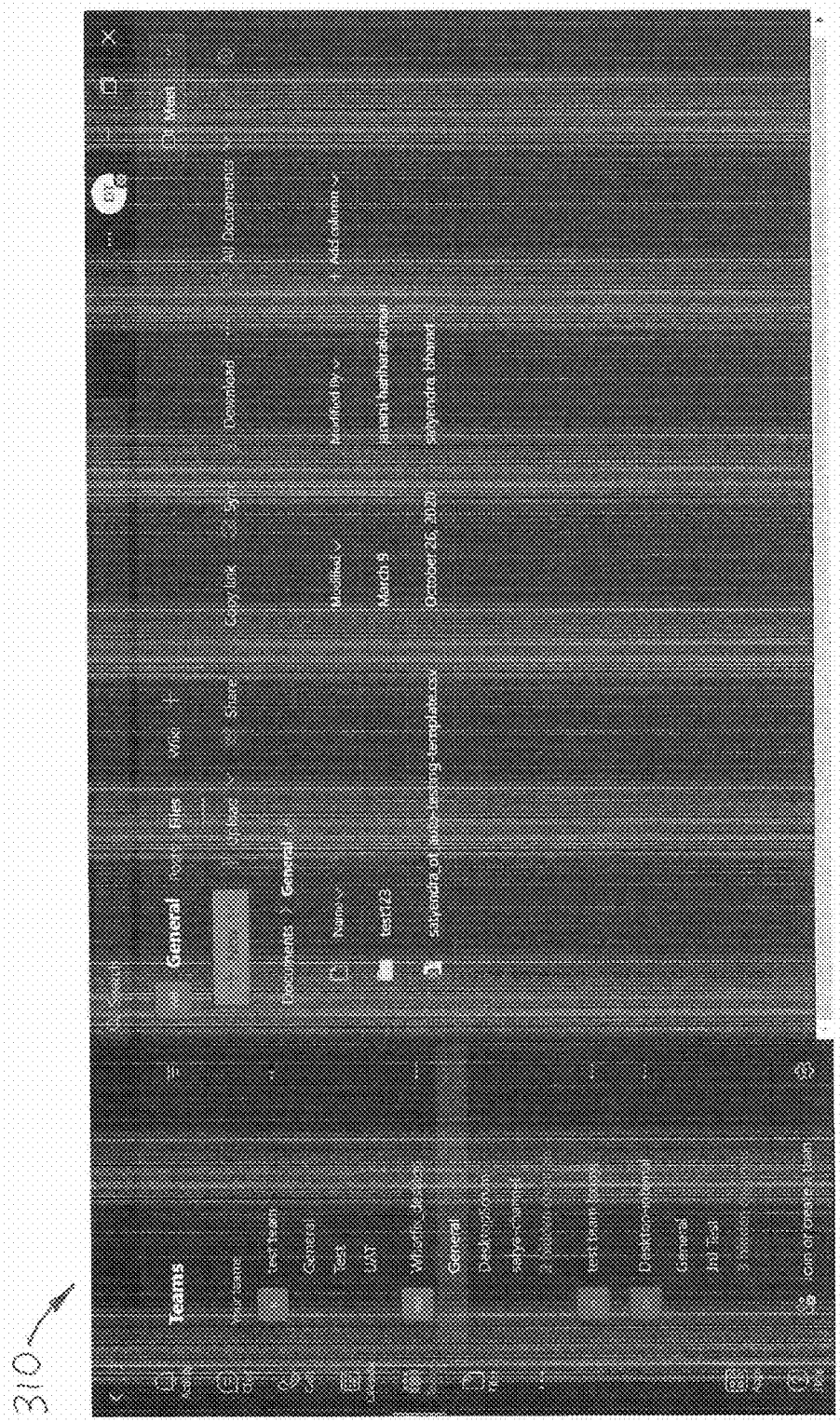
FIG. 12 is a partial screenshot of an exemplary underlying base application showing an Image having a dark-colored theme.
Figure 13:
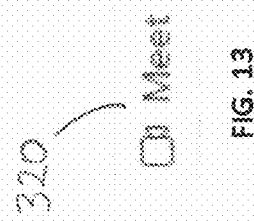
FIG. 13 is an exemplary Template to be searched for in the Images of FIGS. 11 and 12.

Referring to FIG. 11, a first example of a user interface (UI) screenshot Image 300 captured in light theme (white background) is provided. FIG. 12 shows a second example of a UI screenshot Image 310 captured in dark theme (black background). In FIG. 13, Template 320 was captured in a light theme. For both the examples, the Image and Template configuration is as follows:

Image (Entire UI screenshot): 150% Scale, 1920×1080 Resolution

Template (UI element screenshot): 100% Scale, 1920×1080 Resolution

The difference in scales (or simply zoom factor) for the images is intentionally kept to emulate the challenges of the scale-invariant template matching in real-world use-cases. A confidence threshold of >=0.9 is set where the element is then considered to be the best matched, and a breakout of further search iterations occurs.

Figures 14, 15:
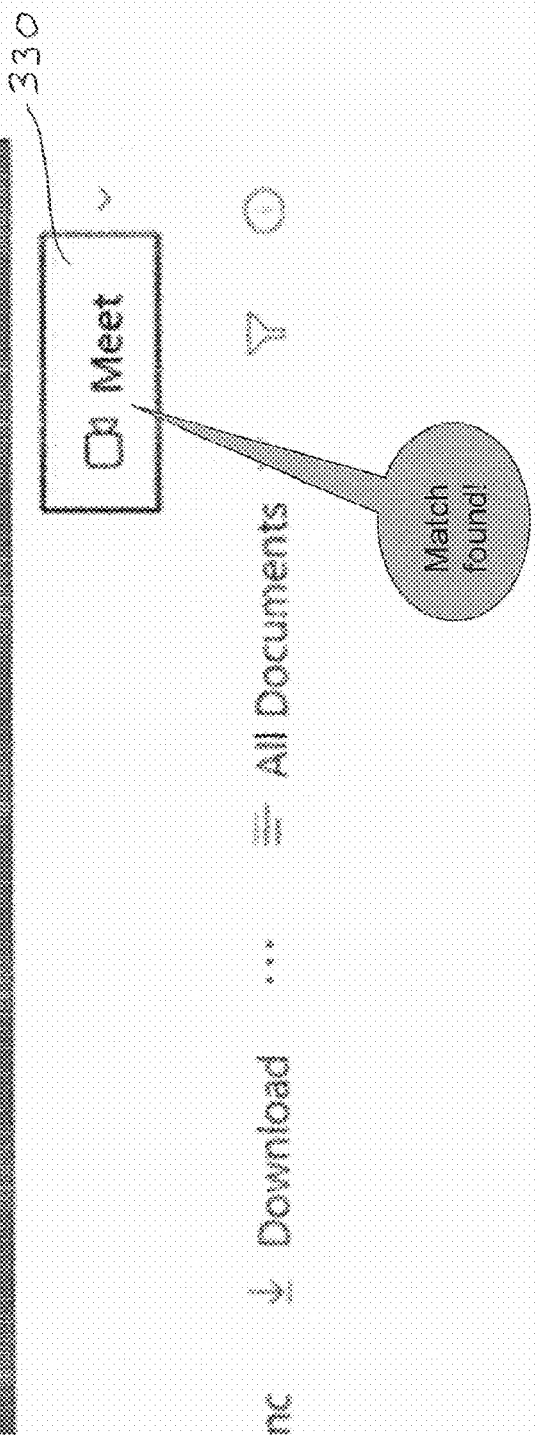
FIG. 14 is a table showing the results of searching the Image of FIG. 11 for the Template of FIG. 13 using a conventional approach.
FIG. 15 is a partial screenshot showing the results of searching the Image of FIG. 11 for the Template of FIG. 13 using a conventional approach.

Referring to FIG. 14, a conventional approach is first used to search Image 300 (FIG. 11) for Template 320 (FIG. 13) to provide baseline results to compare with the inventive methods disclosed herein. This first example involves a light-theme Template search on a light-theme Image. In this example, a search is performed across multiple scales, with no grayscale conversion, no Gaussian filter, no background color detection and no pre-adjustment of the Template based on image scale-factor. Since the scale ratio between Template and Image is not known in this scenario, the template matching is run across multiple scale values in an iterative manner.

In this first example, a match 330 is found, as shown in FIG. 15. However, as can be seen in FIG. 14, it takes over 3 seconds to iterate over 8 scales. The preset best match found criteria (confidence>=0.9) is not met in this case, hence, the operation could not break out from the search loop. The best matched Element is achieved at a confidence level of 0.567 in this case.

Figures 16, 17:
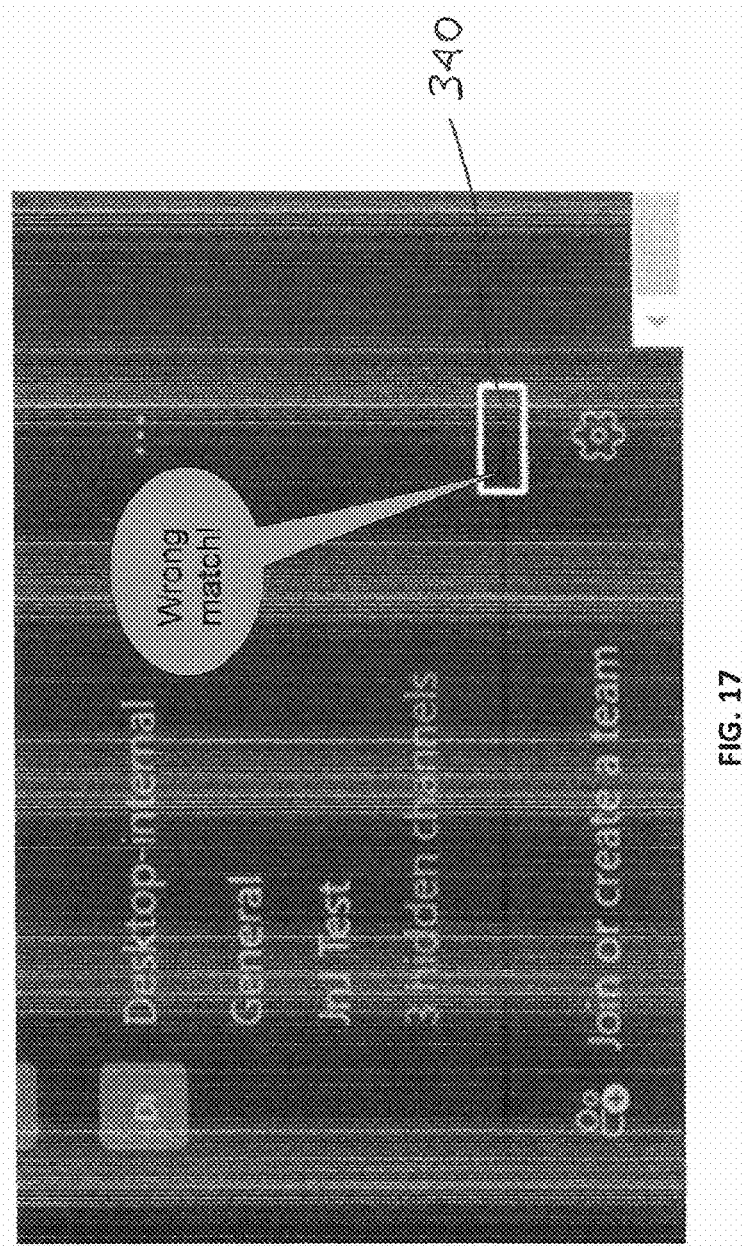
FIG. 16 is a table showing the results of searching the Image of FIG. 12 for the Template of FIG. 13 using a conventional approach.
FIG. 17 is a partial screenshot showing the results of searching the Image of FIG. 12 for the Template of FIG. 13 using a conventional approach.

Referring to FIG. 16, a conventional approach is now used to search the second Image 310 (FIG. 12) for Template 320 (FIG. 13) to provide further baseline results to compare with the inventive methods disclosed herein. This second example involves a light-theme Template search on a dark-theme Image. As with the first example, in this second example a search is performed across multiple scales, with no grayscale conversion, no Gaussian filter, no background color detection and no pre-adjustment of the Template based on image scale-factor. Since the scale ratio between Template and Image is not known in this scenario, the template matching is again run across multiple scale values in an iterative manner.

In this second example, a wrong match 340 is found, as shown in FIG. 17. As can be seen in FIG. 16, it again takes over 3 seconds to iterate over 8 scales. The preset best match found criteria (confidence>=0.9) is again not met in this case, hence, the operation could not break out from the search loop in this second example as well. Here, the normal template match is unable to detect the correct element.

Referring to FIG. 18, the first example above is now run again using inventive template matching method 220. This example involves a light-theme Template search on a light-theme Image. In this method, the scale ratio between Template and Image are known from system meta-data. Therefore, before searching over various scales, the Template is first rescaled and the template match search is then run. If a match is found (confidence>=0.9), the method does not iterate over multiple scales, and consequently a significant amount of time is saved.

In this first example using method 220, a match 330 is found, as shown in FIG. 19. As can be seen in FIG. 18, the match is found at the first try. The time taken is significantly less as compared to the conventional approach, taking only 163.6 ms instead of 3472.78 ms.

Figures 20, 21:
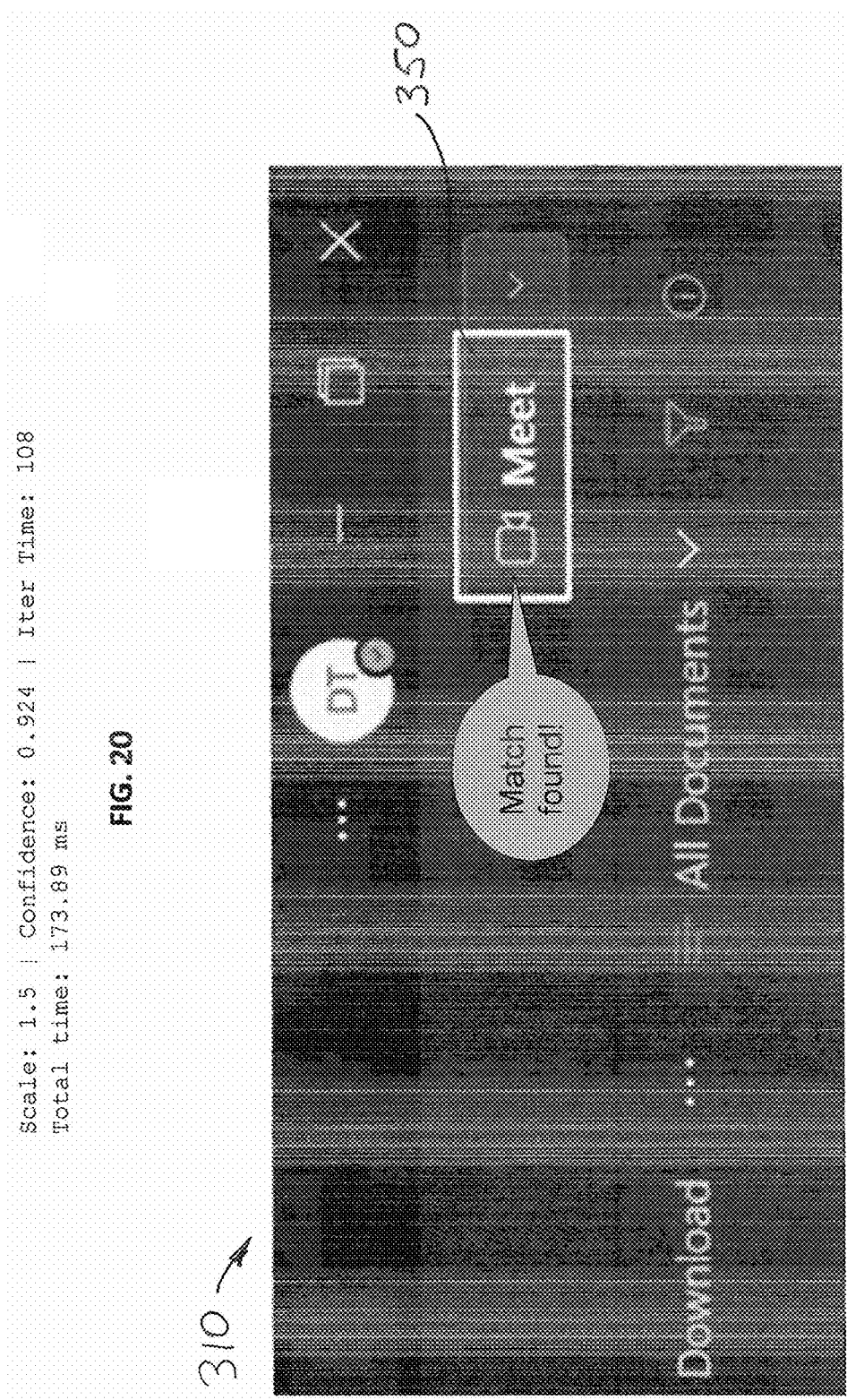
FIG. 20 is a table showing the results of searching the Image of FIG. 12 for the Template of FIG. 13 using the exemplary method of FIG. 10.
FIG. 21 is a partial screenshot showing the results of searching the Image of FIG. 12 for the Template of FIG. 13 using the exemplary method of FIG. 10.

Referring to FIG. 20, the second example above is now run again using inventive template matching method 220. This example involves a light-theme Template search on a dark-theme Image. In this method, the scale ratio between Template and Image are again known from system metadata. Therefore, before searching over various scales, the Template is first rescaled and the template match search is then run. If a match is found (confidence>=0.9), the method does not iterate over multiple scales, and consequently a significant amount of time is saved.

In this second example using method 220, a match 350 is found, as shown in FIG. 21. As can be seen in FIG. 20, the match is again found at the first try and with high confidence. The conventional approach taken in this particular case failed, whereas the use of inventive method 220 was able to detect the correct element. This is because method 220 pre-processes the Template based on the background color of the Image, so that both correspond to the same theme setting. The time taken is only 173.89 ms.

The above examples demonstrate the improvements offered by inventive method 220. With the initial setup of scale, reduced resolution and background adjustments, exemplary method 220 is able to make the template matching algorithm more robust, more accurate and much faster. In particular:

- The confidence at which the inventive method detected the Template went up from 0.567 to 0.914 (Image 1), which is about a 60% improvement.
- The total time taken (Image 1) went down from over 3 seconds to about 163 ms, which is about a 95% reduction in time.
- In the case where the element and the UI screenshot were captured on different theme settings, the inventive method was able to detect the correct element, whereas the conventional template matching algorithm failed.

The above are just a few examples. However, the Applicants have observed similar results with testing on many more data points.

The systems and methods disclosed herein optimize over existing methods to create multiple Templates, wherein the definition of "number of Templates to be created" is not limited and leads to high resource utilization. The resource utilization is proportionate to the number of Templates that are created and used before the match is found. The optimization may be achieved through various means, which in some implementations include:

- Predictability in defining Scale Space: As an indirect outcome of performance optimization, predictability in defining the template scale space is brought in. In many instances, the number of templates to be created before the correct match is obtained can be restricted to 2 or 3, with over 90% confidence obtained.
- Use of meta-data for optimized scale-search: Using operating system-level scale information, the correct scaling factor can be estimated for the Template in order to get an optimized match, as opposed to brute-force searching across a range of scales.
- Display theme/background color detection: Modern applications typically have a built-in light and dark theme. The systems and methods disclosed herein can run template matching on user interfaces having unknown theme settings. Therefore, the disclosed systems and methods can be made display theme agnostic by doing background color detection and modifying the Template accordingly.
- Reduce Resolution: Working on reduced resolution of an Image without losing details can help to reduce the calculations that are required to match a Template to an Image.

In some embodiments, fewer or additional steps to those described herein may be utilized, and/or the steps may be performed in a different order.

Various alternatives, modifications, and equivalents may be used in lieu of the above components. Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code may be applied to data entered using an input device to perform the functions described and to generate output information. The output information may be applied to one or more output devices.

Each program may be implemented in a high-level procedural or object-oriented programming language to operate in conjunction with a computer system. However, the programs may be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Thus, any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control or perform any of the steps, including but not limited to: displaying, communicating with the user, analyzing, modifying parameters (including timing, frequency, intensity, etc.), determining, alerting, or the like.

While exemplary embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached, or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the disclosure. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present disclosure.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and/or methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims. When a feature is described as optional, that does not necessarily mean that other features not described as optional are required.

The examples and illustrations included herein show, by way of illustration and not of limitation, specific embodiments in which the subject matter may be practiced. As mentioned, other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of performing optimized template matching within a digital adoption platform used in conjunction with an underlying computer application, the method comprising the steps of:
   capturing an original image and template from a user interface of the underlying application;
   converting the original image and the original template to grayscale;
   detecting a background type of the converted image and of the converted template, and inverting the background type of either the converted template or the converted image if there is a mismatch to create a matched image and template;
   applying a Gaussian filter to the matched image and to the matched template to reduce any noise and any blurring in the matched image and in the matched template;
   dividing a scale of the filtered image by a scale of the filtered template to determine a starting scale;
   reducing a resolution of at least the filtered image;
   applying a template matching algorithm to the reduced resolution image and the reduced resolution or filtered template using the starting scale to locate the original template in the original image; and
   remapping coordinates of the original template to reflect its original location on the original image.

2. The method according to claim 1, wherein the detecting step comprises:
   calculating a maximum total pixel intensity of the converted image or the converted template if it were to have a light background; and
   calculating a minimum total pixel intensity of the converted image or the converted template if it were to have a dark background.

3. The method according to claim 2, further comprising calculating a mean total pixel intensity based upon the maximum total pixel intensity and the minimum total pixel intensity, wherein the mean total pixel intensity equals a mean intensity multiplied by a horizontal number of pixels in the converted image or the converted template and multiplied by a vertical number of pixels in the converted image or the converted template.

4. The method according to claim 3, further comprising calculating a total pixel intensity of the converted image or the converted template by adding up an intensity of each of its pixels.

5. The method according to claim 4, further comprising comparing the total pixel intensity of the converted image or the converted template to the mean total pixel intensity.

6. The method according to claim 5, further comprising labeling the converted image or the converted template as having a light background if its total pixel intensity is greater than the mean total pixel intensity, or labeling the converted image or the converted template as having a dark background if its total pixel intensity is less than the mean total pixel intensity.

7. The method according to claim 6, further comprising inverting the background type of the converted template if there is a mismatch between the background type of the converted template and the converted image.

8. The method according to claim 1, wherein the step of reducing a resolution of at least the filtered image includes also reducing a resolution of the filtered template.

9. The method according to claim 1, wherein if the original template is not located in the original image when using the starting scale during the application of the template matching algorithm, the method further comprising running the template matching algorithm again with a different scale ratio.

10. The method according to claim 9, wherein the different scale ratio is 1.0.

11. The method according to claim 10, wherein if the original template is not located in the original image when using the different scale ratio of 1.0 during the application of the template matching algorithm, the method further comprising incrementally increasing the different scale ratio and running the template matching algorithm again.

12. The method according to claim 11, further comprising further incrementing the different scale ratio and rerunning the template matching algorithm until the original template is located in the original image or the different scale ratio reaches a predetermined number.

13. The method according to claim 12, wherein the predetermined number is 2.0.

14. The method according to claim 12, wherein the different scale ratio is incremented by 0.2 each time the template matching algorithm is rerun.

15. A non-transitory computing device readable medium having instructions stored thereon for providing digital guidance in an underlying computer application, wherein the instructions are executable by a processor to cause a computing device to:
   capture an original image and template from a user interface of the underlying application;
   convert the original image and the original template to grayscale;
   detect a background type of the converted image and of the converted template, and invert the background type of either the converted template or the converted image if there is a mismatch to create a matched image and template;
   apply a Gaussian filter to the matched image and to the matched template to reduce any noise and any blurring in the matched image and in the matched template;
   divide a scale of the filtered image by a scale of the filtered template to determine a starting scale;
   reduce a resolution of at least the filtered image;
   apply a template matching algorithm to the reduced resolution image and the reduced resolution or filtered template using the starting scale to locate the original template in the original image; and
   remap coordinates of the original template to reflect its original location on the original image.

16. The non-transitory computing device readable medium according to claim 15, wherein the detecting step comprises:

calculating a maximum total pixel intensity of the converted image or the converted template if it were to have a light background; and calculating a minimum total pixel intensity of the converted image or the converted template if it were to have a dark background.

17. The non-transitory computing device readable medium according to claim 16, wherein the instructions further cause the computing device to calculate a mean total pixel intensity based upon the maximum total pixel intensity and the minimum total pixel intensity, wherein the mean total pixel intensity equals a mean intensity multiplied by a horizontal number of pixels in the converted image or the converted template and multiplied by a vertical number of pixels in the converted image or the converted template.

18. The non-transitory computing device readable medium according to claim 17, wherein the instructions further cause the computing device to calculate a total pixel intensity of the converted image or the converted template by adding up an intensity of each of its pixels.

19. The non-transitory computing device readable medium according to claim 18, wherein the instructions further cause the computing device to compare the total pixel intensity of the converted image or the converted template to the mean total pixel intensity.

20. The non-transitory computing device readable medium according to claim 19, wherein the instructions further cause the computing device to label the converted image or the converted template as having a light background if its total pixel intensity is greater than the mean total pixel intensity, or label the converted image or the converted template as having a dark background if its total pixel intensity is less than the mean total pixel intensity.

21. The non-transitory computing device readable medium according to claim 20, wherein the instructions further cause the computing device to invert the background type of the converted template if there is a mismatch between the background type of the converted template and the converted image.

22. The non-transitory computing device readable medium according to claim 15, wherein the step of reducing a resolution of at least the filtered image includes also reducing a resolution of the filtered template.

23. The non-transitory computing device readable medium according to claim 15, wherein if the original template is not located in the original image when using the starting scale during the application of the template matching algorithm, the instructions further cause the computing device to run the template matching algorithm again with a different scale ratio.

24. The non-transitory computing device readable medium according to claim 23, wherein the different scale ratio is 1.0.

25. The non-transitory computing device readable medium according to claim 24, wherein if the original template is not located in the original image when using the different scale ratio of 1.0 during the application of the template matching algorithm, the instructions further cause the computing device to incrementally increase the different scale ratio and run the template matching algorithm again.

26. The non-transitory computing device readable medium according to claim 25, wherein the instructions further cause the computing device to increment the different scale ratio and rerun the template matching algorithm until the original template is located in the original image or the different scale ratio reaches a predetermined number.

27. The non-transitory computing device readable medium according to claim 26, wherein the predetermined number is 2.0.

28. The non-transitory computing device readable medium according to claim 26, wherein the different scale ratio is incremented by 0.2 each time the template matching algorithm is rerun.

\* \* \* \* \*